US010516750B2

(12) United States Patent
Shibuya et al.

(10) Patent No.: US 10,516,750 B2
(45) Date of Patent: Dec. 24, 2019

(54) DISPLAY CONTROL METHOD, DISPLAY CONTROL DEVICE, AND RECORDING MEDIUM

(71) Applicant: FUJITSU LIMITED, Kawasaki-shi, Kanagawa (JP)

(72) Inventors: Mizuki Shibuya, Machida (JP); Yasuhiro Tsuyuki, Numazu (JP); Yugo Matsuda, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/720,942

(22) Filed: Sep. 29, 2017

(65) Prior Publication Data

US 2018/0103114 A1    Apr. 12, 2018

(30) Foreign Application Priority Data

Oct. 6, 2016  (JP) .................................. 2016-198077

(51) Int. Cl.
| | |
|---|---|
| *H04W 4/12* | (2009.01) |
| *H04L 29/08* | (2006.01) |
| *H04M 1/725* | (2006.01) |
| *H04M 15/00* | (2006.01) |
| *H04W 68/00* | (2009.01) |
| *H04L 29/06* | (2006.01) |

(52) U.S. Cl.
CPC .......... *H04L 67/26* (2013.01); *H04L 67/1014* (2013.01); *H04L 67/2842* (2013.01); *H04M 1/72525* (2013.01); *H04M 15/85* (2013.01); *H04W 4/12* (2013.01); *H04W 68/005* (2013.01); *H04L 29/06027* (2013.01); *H04L 29/06176* (2013.01)

(58) Field of Classification Search
CPC ... H04W 40/22; H04W 52/0254; H04W 4/90; H04W 4/12; H04H 60/43; H04L 51/26; H04L 12/1813; H04L 1/1867; H04L 67/88; H04L 67/1095
USPC ............... 455/3.01, 412.2; 725/110; 709/205
See application file for complete search history.

(56) References Cited

U.S. PATENT DOCUMENTS

| | | | | |
|---|---|---|---|---|
| 9,294,565 | B2* | 3/2016 | Kazan | H04L 67/1095 |
| 9,366,542 | B2* | 6/2016 | Singh | G01C 21/3484 |
| 9,628,427 | B2* | 4/2017 | Chiu | H04L 51/24 |
| 9,900,119 | B2* | 2/2018 | Daoura | H04W 40/22 |
| 2001/0034735 | A1* | 10/2001 | Sugiyama | G06F 17/30867 |
| 2004/0024819 | A1* | 2/2004 | Sasaki | H04L 12/1813 709/205 |
| 2007/0011198 | A1* | 1/2007 | Fukui | G06F 21/608 |

(Continued)

FOREIGN PATENT DOCUMENTS

| | | |
|---|---|---|
| JP | 2002-334033 | 11/2002 |
| JP | 2010-522912 | 7/2010 |

(Continued)

*Primary Examiner* — William D Cumming
(74) *Attorney, Agent, or Firm* — Fujitsu Patent Center

(57) ABSTRACT

A non-transitory computer-readable recording medium stores a display control program that causes a computer to execute a process. The process includes, receiving a notification from a terminal in one-way communication, when identification information included in the received notification is detected, extracting data included in the notification, and updating display contents of a display device from first display contents to second display contents based on the extracted data.

17 Claims, 24 Drawing Sheets

(56) References Cited

U.S. PATENT DOCUMENTS

| | | | |
|---|---|---|---|
| 2007/0061282 A1 | 3/2007 | Ganguly et al. | |
| 2007/0268906 A1* | 11/2007 | Shozaki | H04L 29/12047 |
| | | | 370/392 |
| 2009/0013387 A1 | 1/2009 | Paas et al. | |
| 2011/0040985 A1* | 2/2011 | Tsuchiya | G06Q 10/10 |
| | | | 713/190 |
| 2011/0216002 A1* | 9/2011 | Weising | G09G 5/08 |
| | | | 345/158 |
| 2013/0040610 A1* | 2/2013 | Migicovsky | H04L 1/1867 |
| | | | 455/412.2 |
| 2013/0144954 A1* | 6/2013 | Li | H04L 67/28 |
| | | | 709/205 |
| 2014/0090000 A1* | 3/2014 | Takechi | H04H 60/43 |
| | | | 725/110 |
| 2016/0182170 A1* | 6/2016 | Daoura | H04W 40/22 |
| | | | 455/3.01 |
| 2016/0226810 A1* | 8/2016 | Chiu | H04L 51/24 |
| 2017/0280384 A1* | 9/2017 | Denzel | H04W 52/0254 |
| 2018/0103114 A1* | 4/2018 | Shibuya | H04W 4/12 |

FOREIGN PATENT DOCUMENTS

| | | |
|---|---|---|
| JP | 2011-65245 | 3/2011 |
| WO | 2007-032549 | 3/2007 |

* cited by examiner

FIG. 5

```
[ID]0000/sample.html
[msg]NOW ON SALE FOR ONE-HOUR LIMITED TIME!!
[event]updateMoment
[do]after(1*60*60)
[HTML]

```
<html>
  <head>
    <title>TEST HTML</title>
  </head>
  <body>
    Hello World
  </body>
</html>
```

FIG. 9

```
<html>
  <head>
    <title>TEST HTML</title>
  </head>
  <body>
    <script>
        function popup(){
           alert("Hello World");
        }
    </script>
    <input type="button" value="BUTTON" onclick="popup()">
  </body>
</html>
```

FIG. 10

```
[ID]0000/test.html
[msg] CONTENT HAS BEEN UPDATED.
[event]update1
[HTML]
<html>
  <head>
    <title>TEST HTML</title>
  </head>
  <body>
    <script>
        function popup(){
           alert("Hello World");
        }
    </script>
    <input type="button" value="BUTTON" onclick="popup()">
  </body>
</html>
[/ID]
```

FIG. 11

```
<html>
 <head>
  <title>TEST HTML</title>
 </head>
 <body>
  <script>
     function popup(){
        alert("Good morning");
     }
  </script>
  <input type="button" value="BUTTON" onclick="popup()">
 </body>
</html>
```

FIG. 12

```
<html>
  <head>
    <title>TEST HTML</title>
  </head>
  <body>
    <script>
        function popup(){
          alert("Update");
        }
    </script>
    <input type="button" value="BUTTON" onclick="popup()">
  </body>
</html>
```

FIG. 13

```
[ID]0000/test.html
[msg]THE MESSAGE OF THE CONTENT HAS BEEN UPDATED.
[event]update1
[script]
    <script>
        function popup(){
            alert("Update");
        }
    </script>
[/ID]
```

FIG. 16

```
[ID]0000/sample.html
[msg]LUNCH TIME LIMITED SERVICES BEING CARRIED OUT!!
[event]updateMoment
[do]time(YYYY/MM/DD/13:00)
[HTML]

[ID]0000/sample.html
[msg] SELL ICE CREAM AT A SPECIAL PRICE!!
[event] conditionsDisplay
[do]temperature(35), light(20000)
[HTML]

┌─────────────────────────────┐ /191
└─────────────────────────────┘

[/ID]

DISPLAY CONTROL METHOD, DISPLAY CONTROL DEVICE, AND RECORDING MEDIUM

CROSS-REFERENCE TO RELATED APPLICATION

This application is based upon and claims the benefit of priority of the prior Japanese Patent Application No. 2016-198077, filed on Oct. 6, 2016, the entire contents of which are incorporated herein by reference.

FIELD

The embodiments discussed herein are related to a display control technology.

BACKGROUND

Among applications that run on a terminal device, such as a smartphone, a tablet, or the like, there are applications that display a content downloaded from a content distribution server on a screen of the terminal device. For example, an application that provides information of sale on a product sold by a store, and the like.

Updating a content displayed on a terminal device is started by a content server notifying a user of the terminal device of being able to update by a push notification, and then the user of the terminal device giving an instruction (for example, tapping).

The terminal device that has received the instruction from the user transmits a download request of content to the content server, and the content server transmits the content to the terminal device. In this manner, a plurality of times of communications occur other than the push notification until the content is updated. The terminal device, such as a smartphone, a tablet, or the like performs wireless communication, and thus the communication state is tends to be unstable. If a communication fails, a communication retrial is carried out, and thus it takes time until update is completed.

Regarding updating of content, a certain document discloses a technique for updating content in a local cache with a content downloaded from a server. However, even if the content in the local cache is updated, the display of a terminal device is not updated immediately. Accordingly, a user sometimes has to further perform operation in order to update the display of the terminal device.

Related technologies are disclosed in, for example, Japanese Laid-open Patent Publication No. 2002-334033 and Japanese National Publication of International Patent Application No. 2010-522912.

SUMMARY

According to an aspect of the invention, a non-transitory computer-readable recording medium stores a display control program that causes a computer to execute a process. The process includes, receiving a notification from a terminal in one-way communication, when identification information included in the received notification is detected, extracting data included in the notification, and updating display contents of a display device from first display contents to second display contents based on the extracted data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of a push notification;

FIG. 8 is a diagram illustrating an example of a content;

FIG. 9 is a diagram illustrating an example of a content;

FIG. 10 is a diagram illustrating an example of a push notification;

FIG. 11 is a diagram illustrating an example of a content;

FIG. 12 is a diagram illustrating an example of a content;

FIG. 13 is a diagram illustrating an example of push notifications;

FIG. 16 is a diagram illustrating an example of a push notification;

FIG. 19 is a diagram illustrating an example of a push notification;

DESCRIPTION OF EMBODIMENTS

Figure 1:
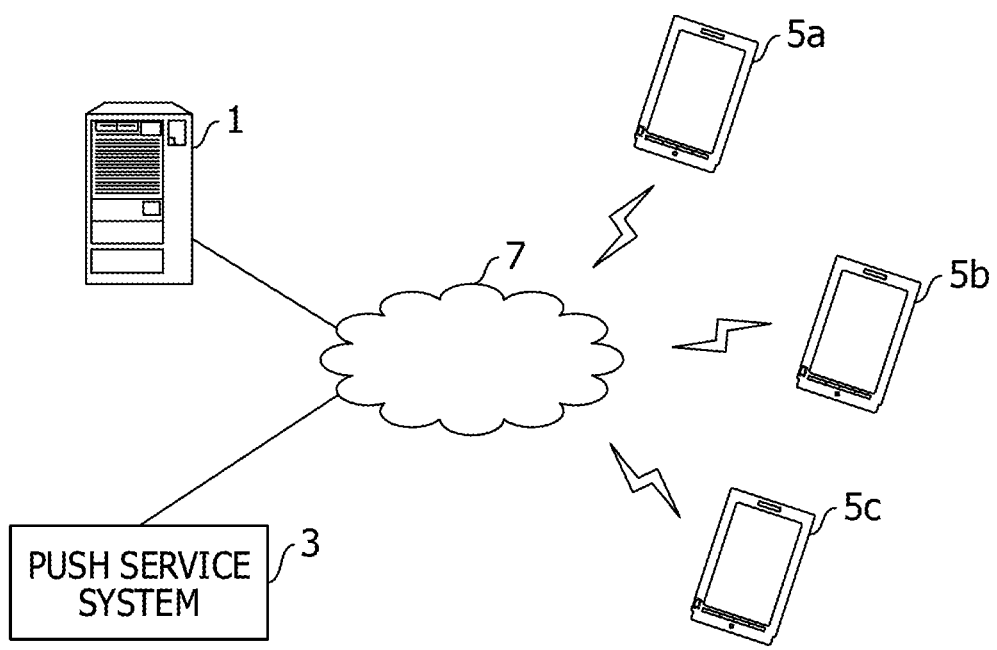
FIG. 1 is a diagram illustrating a network configuration of the present embodiment.

FIG. 1 illustrates a network configuration according to the present embodiment. For example, an application providing server 1, a push service system 3, and user terminals 5a to 5c are coupled to a network 7, which is the Internet. In FIG. 1, the application providing server 1 and the push service system 3 are coupled to the network 7 in a wired manner. However, they may be coupled wirelessly. Although the number of user terminals is three, the number is not limited.

The application providing server 1 is, for example, a physical server and distributes an application that runs on the user terminals 5a to 5c. The push service system 3 is a system of an organization that provides the operating systems (OSs) of the user terminals 5a to 5c. The user terminals 5a to 5c are mobile terminals, for example, smartphones, tablets, or the like and include installed applications provided from the application providing server 1.

When a push notification is distributed to the user terminals 5a to 5c, authentication is performed between the push service system 3 and the user terminals 5a to 5c, and between the push service system 3 and the application providing server 1. After that, the application providing server 1 transmits data having a specified transmission destination to the push service system 3. The push service system 3 distributes the received data to the specified transmission destination by a push notification. A push notification is a notification that is transmitted by one-way communication, and the notification is distributed to the user terminals 5a to 5c without the user terminals 5a to 5c accessing the push service system 3.

Figure 2:
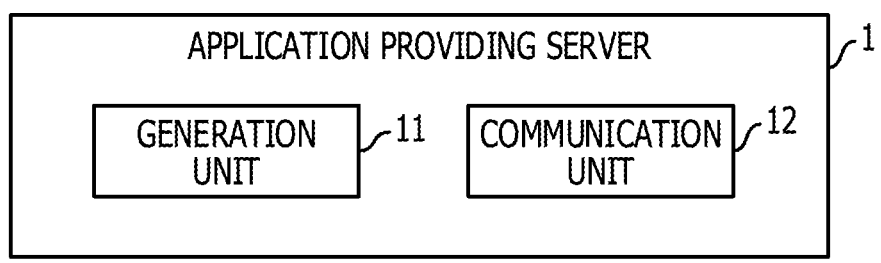
FIG. 2 is a functional block diagram of an application providing server.

FIG. 2 illustrates a functional block diagram of the application providing server 1. The application providing server 1 includes a generation unit 11 and a communication unit 12. The generation unit 11 generates a push notification. The communication unit 12 transmits the push notification generated by the generation unit 11 to the push service system 3.

Figure 3:
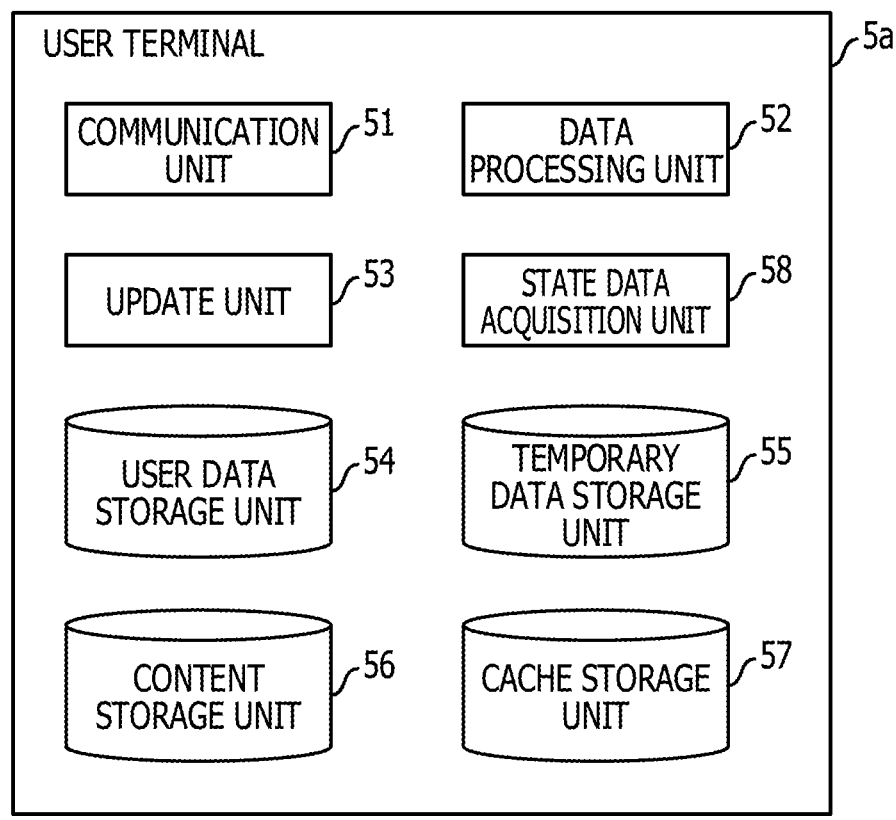
FIG. 3 is a functional block diagram of a user terminal.

FIG. 3 illustrates a functional block diagram of the user terminal 5a. The user terminal 5a includes a communication unit 51, a data processing unit 52, an update unit 53, a user data storage unit 54, a temporary data storage unit 55, a content storage unit 56, a cache storage unit 57, and a state data acquisition unit 58. The communication unit 51 performs processing for receiving a push notification from the push service system 3 and the other communication processing. The data processing unit 52 performs processing for extracting data from the received push notification. The update unit 53 performs update processing of the display on the user terminal 5a based on the data extracted by the data processing unit 52, the data stored in the user data storage unit 54, the data stored in the temporary data storage unit 55, the data stored in the content storage unit 56, the data stored in the cache storage unit 57, and the data obtained by the state data acquisition unit 58. The state data acquisition unit 58 obtains the data on the states (for example, the physical position data of a user terminal, weather data, or the like). In this regard, the functional blocks of the user terminals 5b and 5c are the same as the functional blocks of the user terminal 5a.

Figure 4:
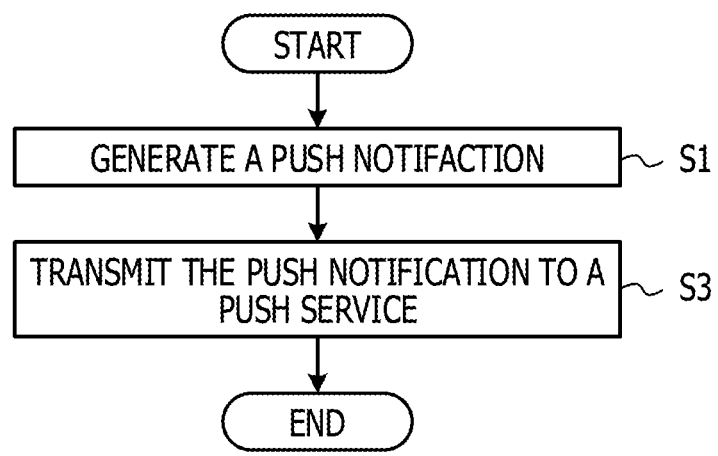
FIG. 4 is a processing flowchart of the processing performed by the application providing server.

Next, a description will be given of the processing performed by the application providing server 1, and the processing performed by the user terminals 5a to 5c with reference to FIG. 4 and FIG. 5. In the present embodiment, data for updating a content (for example, the content after the update or the difference between the content before update and the content after update) is included in a push notification so that the number of communications carried out between the application providing server 1 and the user terminals 5a to 5c at the time of updating a content is reduced to one time. Also, a display is automatically updated in accordance with a push notification so that it allows a user to browse content after the update without requesting the operation of the user.

First, a description will be given of the processing performed by the application providing server 1 with reference to FIG. 4. The generation unit 11 of the application providing server 1 generates a push notification to be distributed to the user terminals 5a to 5c (FIG. 4: step S1).

FIG. 5 illustrates an example of a push notification generated in step S1. In a push notification, the type of information is identified by a character string (hereinafter referred to as identification information) enclosed by brackets. A notation [ID] is given to information (for example, a path of the HyperText Markup Language (HTML) file) of a content to be updated. A plurality of content data blocks may be specified by a plurality of [ID]s. A notation [msg] is given to a message to be displayed in a dialog. A notation [event] is given to information that defines the processing based on the push notification. A notation [do] is given to a parameter (for example, an argument) used by processing based on a push notification. A notation [HTML] is given to HTML data (a rectangle 501, which is a broken-line part, in FIG. 5). In this regard, although not illustrated in FIG. 5, not [HTML] but a notation [script] may be included in a push notification. A notation [script] is given to the data in a <script> part in a JavaScript (registered trademark) file or an HTML file held by the content to be updated. With the push notification illustrated in FIG. 5, the updated content comes to be displayed only for one hour.

In this regard, the push notification may include information of an item other than the items illustrated in FIG. 5. For example, when information indicating the type of a member (for example, a general member, a silver member, a senior member, or the like), and if the information matches the information stored in the user data storage unit 54 and indicating the type of a member, the content may be updated in the user terminal. Thereby, it becomes possible for the application providing server 1 to transmit the same push notification to each transmission destination, and the application providing server 1 may not generate a push notification for each transmission destination. Accordingly, it becomes possible to reduce the processing load of the application providing server 1.

The communication unit 12 of the application providing server 1 transmits the push notification generated in step S1 to the push service system 3 (step S3). Next, the processing terminates. The push service system 3 transmits the push notification received from the application providing server 1 to the user terminals 5a to 5c, which are the specified transmission destinations.

By performing the processing as described above, it is possible for the user terminals 5a to 5c to receive the push notification. The user does not perform an input operation, or the like in order to download the data for updating content from the application providing server 1.

Next, a description will be given of the processing performed by the user terminals 5a to 5c with reference to FIG. 6 to FIG. 23. Note that the processing performed by each user terminal is the same so that, here, a description will be given of the processing performed by the user terminal 5a as an example.

Figure 6:
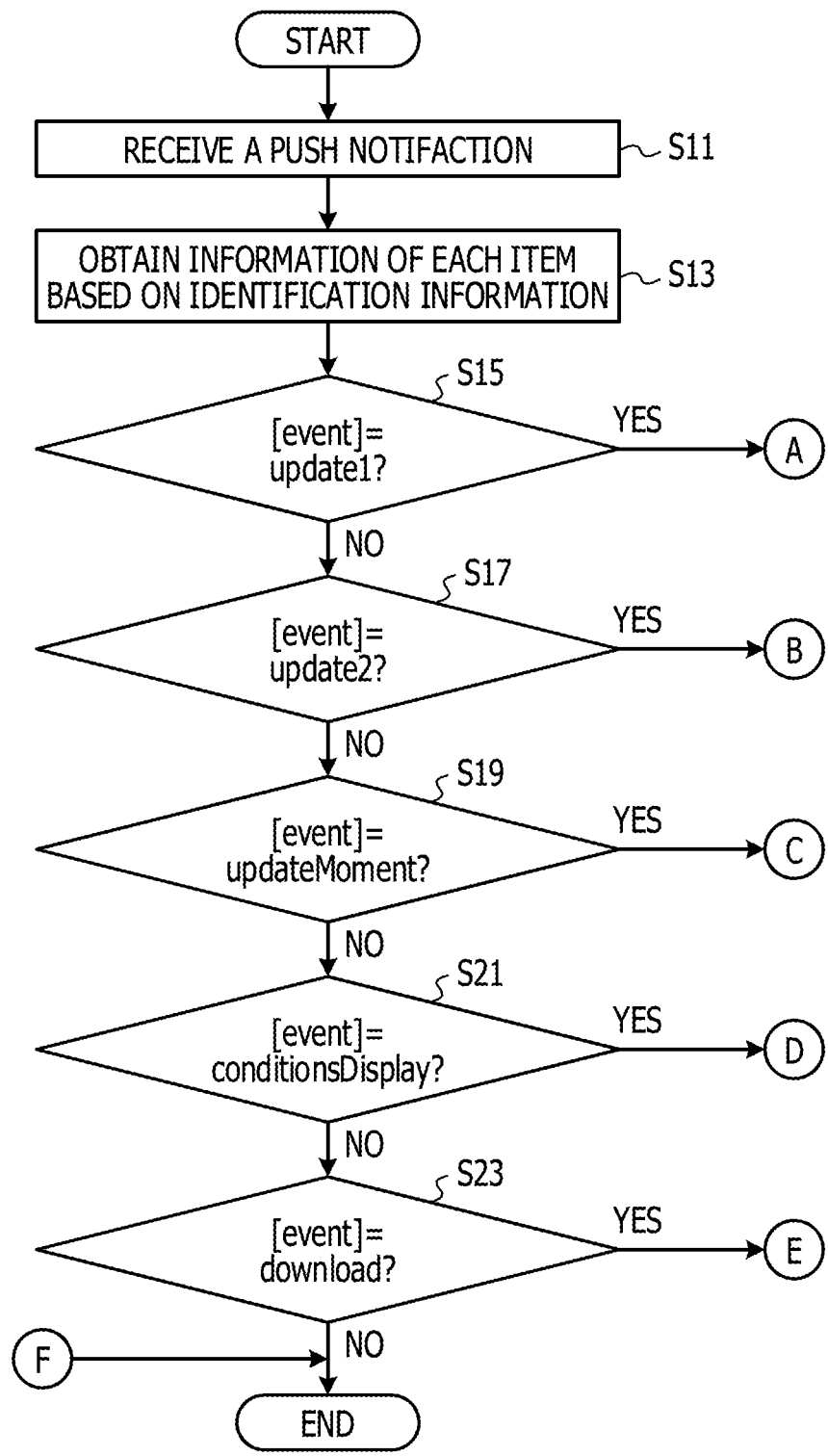
FIG. 6 is a processing flowchart of the processing performed by the user terminal.

First, the communication unit 51 of the user terminal 5a receives the push notification distributed from the push service system 3 (FIG. 6: step S11). The communication unit 51 outputs the received push notification to the data processing unit 52.

The data processing unit 52 obtains the information of each item from the push notification based on the identification information included in the push notification (step S13). The data processing unit 52 outputs the obtained information to the update unit 53.

The update unit 53 determines whether or not "update1" is set as [event] (step S15). If "update1" is set as [event] (step S15: Yes), the processing proceeds to step S31 in FIG. 7 via connector A. A description will be later given of the processing subsequent to connector A.

If "update1" is not set as [event] (step S15: No), the update unit 53 determines whether or not "update2" is set as [event] (step S17). If "update2" is set as [event] (step S17: Yes), the processing proceeds to step S51 in FIG. 15 via connector B. A description will be later given of the processing subsequent to connector B.

If "update2" is not set as [event] (step S17: No), the update unit 53 determines whether or not "updateMoment" is set as [event] (step S19). If "updateMoment" is set as [event] (step S19: Yes), the processing proceeds to step S71 in FIG. 17 via connector C. A description will be later given of the processing subsequent to connector C.

If "updateMoment" is not set as [event] (step S19: No), the update unit 53 determines whether or not "conditionsDisplay" is set as [event] (step S21). If "conditionsDisplay" is set as [event] (step S21: Yes), the processing proceeds to step S101 in FIG. 20 via connector D. A description will be later given of the processing subsequent to connector D.

If "conditionsDisplay" is not set as [event] (step S21: No), the update unit 53 determines whether or not "download" is set as [event] (step S23). If "download" is set as [event] (step S23: Yes), the processing proceeds to step S131 in FIG. 23 via connector E. A description will be later given of the processing subsequent to connector E. On the other hand, if "download" is not set as [event] (step S23: No), the processing terminates.

Next, a description will be given of the processing subsequent to connector A with reference to FIG. 7 to FIG. 14. If "update1" is set as [event], the downloaded content is updated, and if the content is being displayed, the display is also updated.

Figure 7:
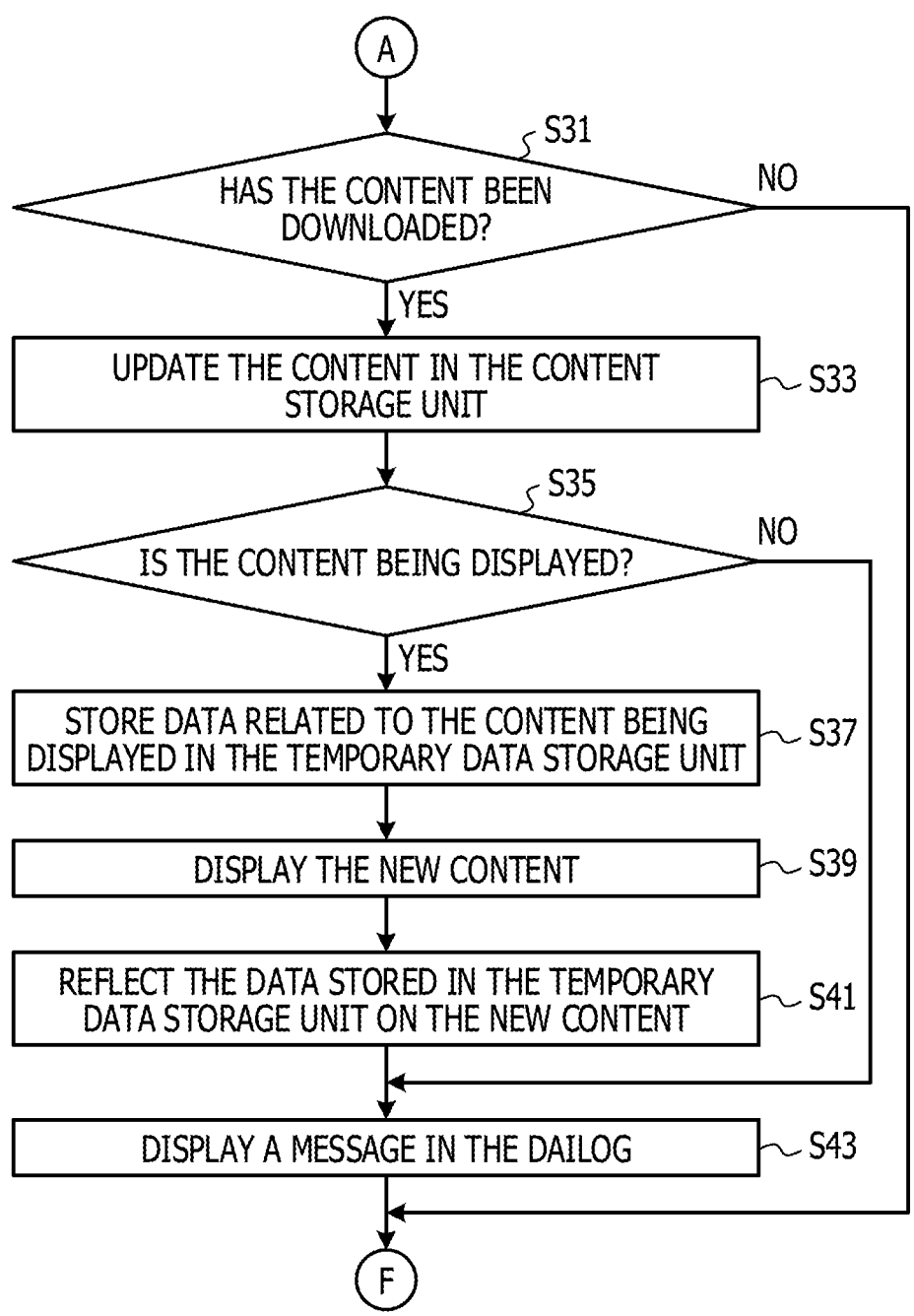
FIG. 7 is a processing flowchart of the processing performed by the user terminal.

The update unit 53 determines whether or not a content (hereinafter referred to as target content) specified by [ID] has been downloaded to the user terminal 5a (FIG. 7: step S31). In this regard, in step S31, whether or not a user is a target member based on the information stored in the user data storage unit 54 and indicating a member type.

If the target content has not been downloaded (step S31: No), the processing returns to the processing in FIG. 6 via connector F and terminates.

If the target content has been downloaded (step S31: Yes), the update unit 53 performs the following processing. Specifically, the update unit 53 updates the target content stored in the content storage unit 56 with the data having given [HTML] or [script] in the push notification (step S33).

For example, it is assumed that the content before update is a content as illustrated in FIG. 8, and a button is added to this content and update is carried out so that a dialog is displayed when the button is tapped. In this case, for example, update is carried out to content as illustrated in FIG. 9. For a push notification, for example, data as illustrated in FIG. 10 is used. In the example in FIG. 10, the update contents are specified as [HTML].

For example, it is assumed that a content before the update is a content illustrated in FIG. 11, and for this content, the dialog is updated at the time when a button is tapped. In this case, for example, the content is updated as a content as illustrated in FIG. 12. For a push notification, for example, data as illustrated in FIG. 13 is used. In the example in FIG. 13, the update contents are specified as [script].

The update unit 53 determines whether or not the target content is being displayed (step S35). If the target content is not being displayed (step S35: No), the processing proceeds to the processing in step S43.

If the target content is being displayed (step S35: Yes), the update unit 53 stores the data (for example, the data that was input in the form of a Web page) related to the content being displayed in the temporary data storage unit 55 (step S37).

The update unit 53 displays the content updated in step S33 by reloading, for example (step S39). In this regard, when a browser is installed as an application other than the application provided from the application providing server 1, the content after the update may be displayed in the process of the browser.

The update unit 53 reflects the data stored in the temporary data storage unit 55 on the content being displayed (step S41).

The update unit 53 displays a message given [msg] in the push notification in the dialog (step S43). The processing then terminates. In the same manner as step S39, the message may be displayed by the process of the browser.

Figure 14B:
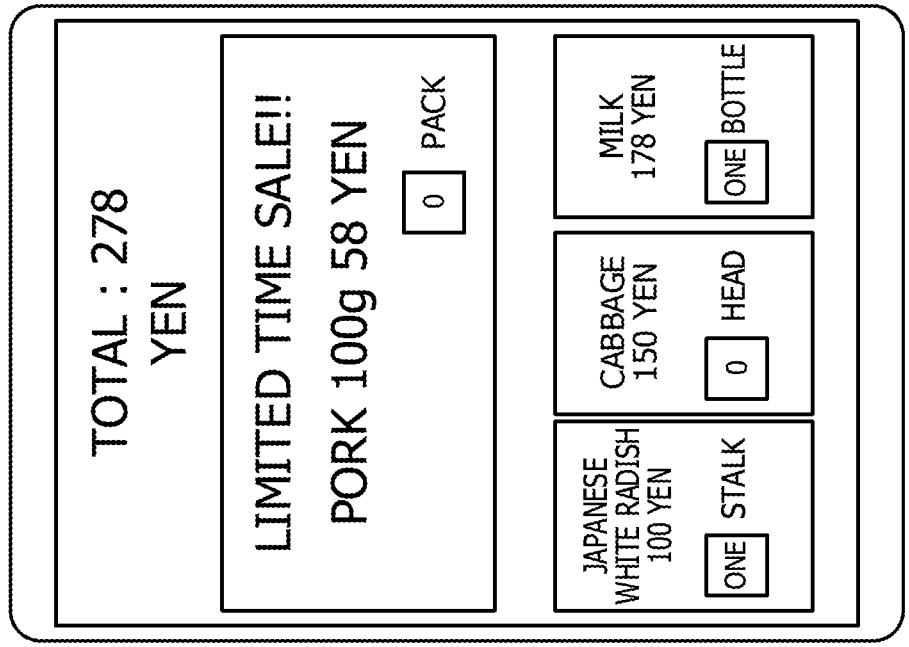
FIGS. 14A and 14B are diagrams illustrating examples of a displayed content, respectively.
Figure 14A:
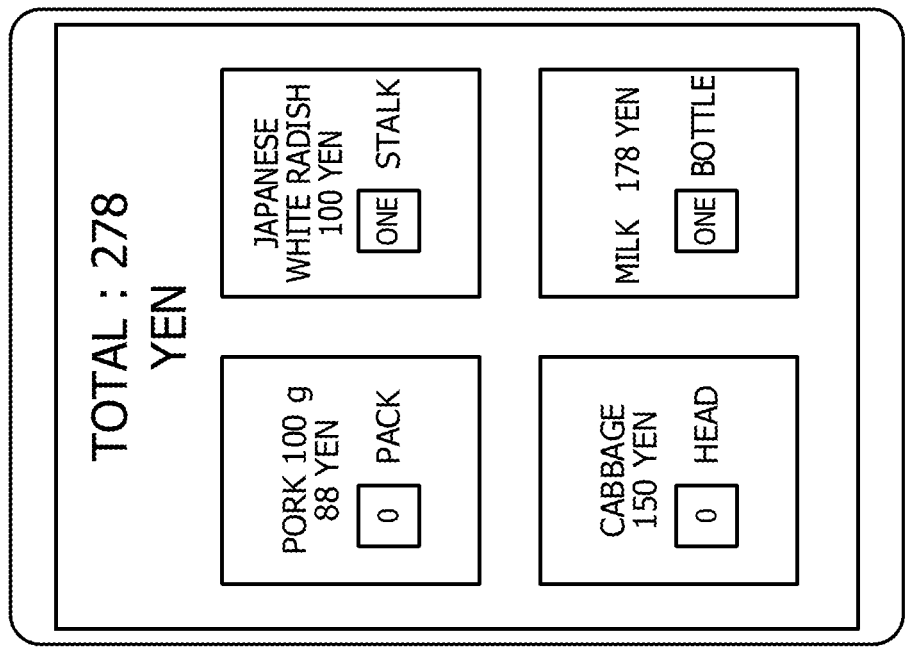

By performing the processing as described above, even if target content is being displayed, it is possible to update the content without losing the input data, or the like, and it becomes possible for a user to browse the content after the update early. For example, when a content illustrated in FIG. 14A is displayed on the screen of the user terminal 5a as a content before the update, a content as illustrated in FIG. 14B will be displayed by carrying out the update.

Next, a description will be given of the processing subsequent to connector B in FIG. 15. If "update2" is set as [event], the downloaded content is updated, and when the content is not being displayed, the display is started.

Figure 15:
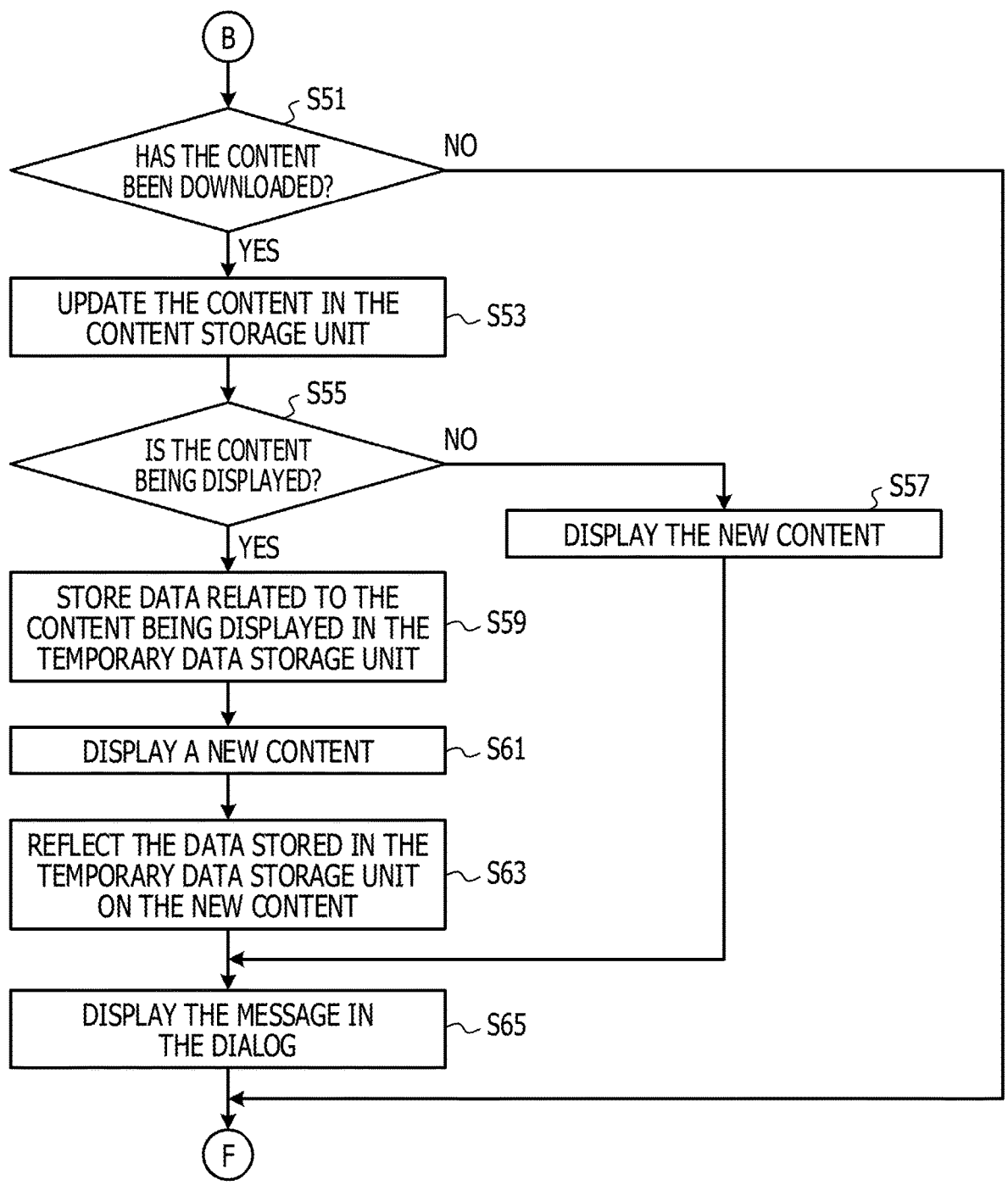
FIG. 15 is a processing flowchart of the processing performed by the user terminal.

The update unit 53 determines whether or not the target content has been downloaded to the user terminal 5a (FIG. 15: step S51). In this regard, in step S51, a determination may be made as to whether the user is a target member based on the information stored in the user data storage unit 54 and indicating a member type.

If the target content has not been downloaded (step S51: No), the processing returns to the processing in FIG. 6 via connector F and the processing terminates.

If the target content has been downloaded (step S51: Yes), the update unit 53 performs the following processing. Specifically, the update unit 53 updates the target content stored in the content storage unit 56 with the data given [HTML] or [script] in the push notification (step S53).

The update unit 53 determines whether or not the target content is being displayed (step S55). If the target content is not being displayed (step S55: No), the update unit 53 loads the content stored in the content storage unit 56 to display the content (step S57). The processing then proceeds to the processing in step S65. In this regard, when a browser is installed as an application other than the application provided from the application providing server 1, the content after the update may be displayed in the process of the browser.

If the target content is being displayed (step S55: Yes), the update unit 53 stores the data (for example, data that was input in the form of a Web page) related to the content being displayed in the temporary data storage unit 55 (step S59).

The update unit 53 displays the content updated in step S53 by reloading, for example (step S61). In the same manner as step S57, the content after the update may be displayed in the process of the browser.

The update unit 53 reflects the data stored in the temporary data storage unit 55 on the content being displayed (step S63).

The update unit 53 displays a message given [msg] in the push notification in the dialog (step S65). The processing then terminates. In the same manner as steps S57 and S61, a message may be displayed in the process of the browser.

By performing the processing as described above, even if the content before the update is not displayed, it becomes possible to display the content after the update, and thus for example, it is effective in the case of a particularly important update, or the like.

Next, a description will be given of the processing subsequent to connector C with reference to FIG. 16 to FIG. 18. If "updateMoment" is set as [event], the display of the downloaded content is temporarily updated. Here, it is assumed that, for example, the push notification as illustrated in FIG. 5 or a push notification as illustrated in FIG. 16 is received. In FIG. 16, HTML data is described in a part of a broken-line rectangle.

Figure 17:
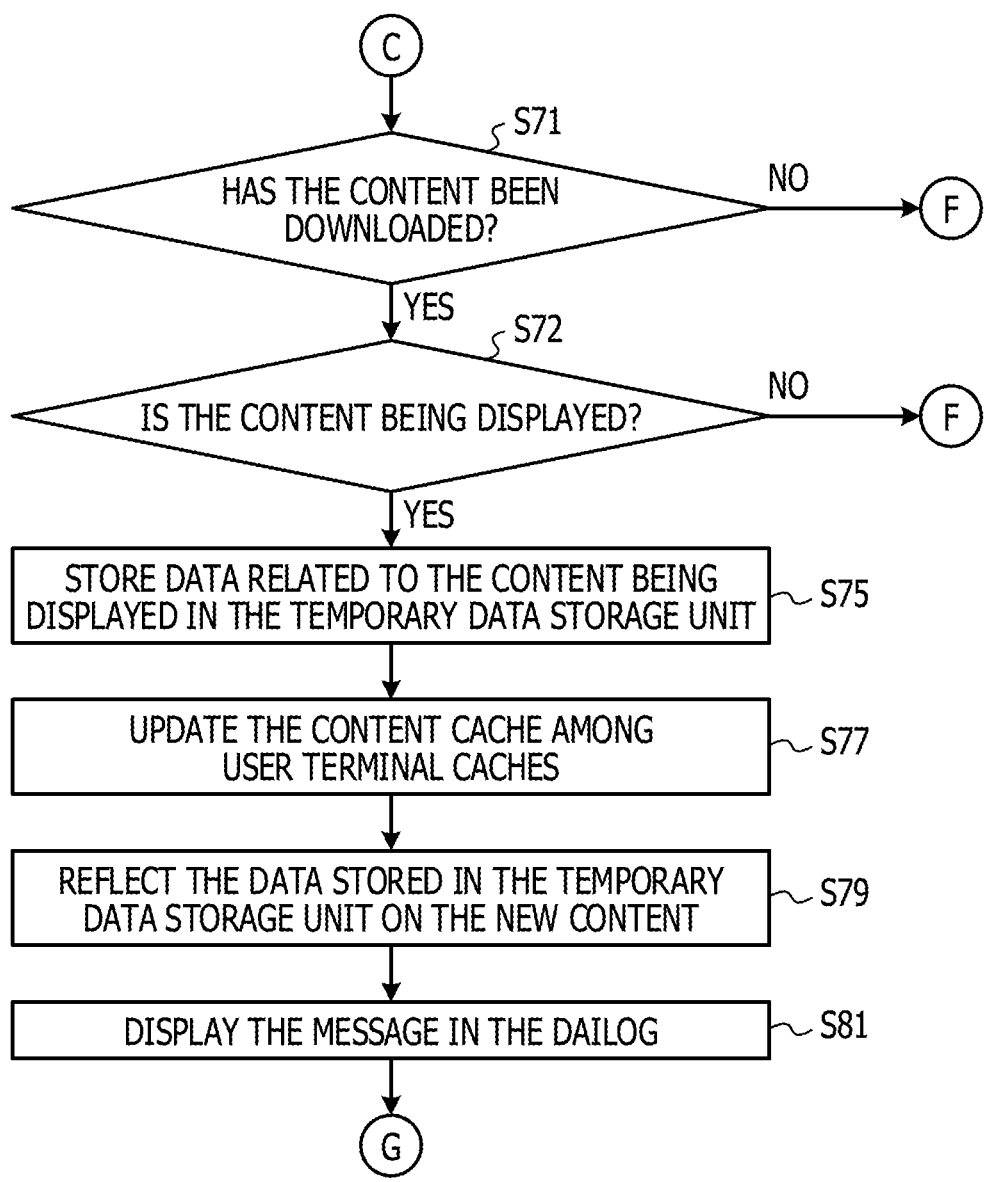
FIG. 17 is a processing flowchart of the processing performed by the user terminal.

The update unit 53 determines whether or not the target content has been downloaded to the user terminal 5*a* (FIG. 17: step S71). In this regard, in step S71, a determination may be made as to whether the user is a target member based on the information stored in the user data storage unit 54 and indicating the member type.

If the target content has not been downloaded (step S71: No), the processing returns to the processing in FIG. 6 via connector F and terminates.

If the target content has been downloaded (step S71: Yes), the update unit 53 determines whether or not the target content is being displayed (step S73). If the target content is not being displayed (step S73: No), the processing returns to the processing in FIG. 6 via connector F and terminates.

If the target content is being displayed (step S73: Yes), the update unit 53 stores data (for example, data that was input in the form of a Web page) related to the content being displayed in the temporary data storage unit 55 (step S75).

The update unit 53 updates a content cache before the update among the caches stored in the cache storage unit 57 with data given [HTML] or [script] in the push notification (step S77). The update unit 53 then displays the content after the update on the screen of the user terminal 5*a*. Here, the update unit 53 may display the content after the update in the process of the browser.

The update unit 53 reflects the data stored in the temporary data storage unit 55 on the content being displayed (step S79).

The update unit 53 displays a message given [msg] in the push notification in the dialog (step S81). The processing then proceeds to step S83 in FIG. 18 via connector G. In step S81, the message may be displayed in the process of the browser.

Figure 18:
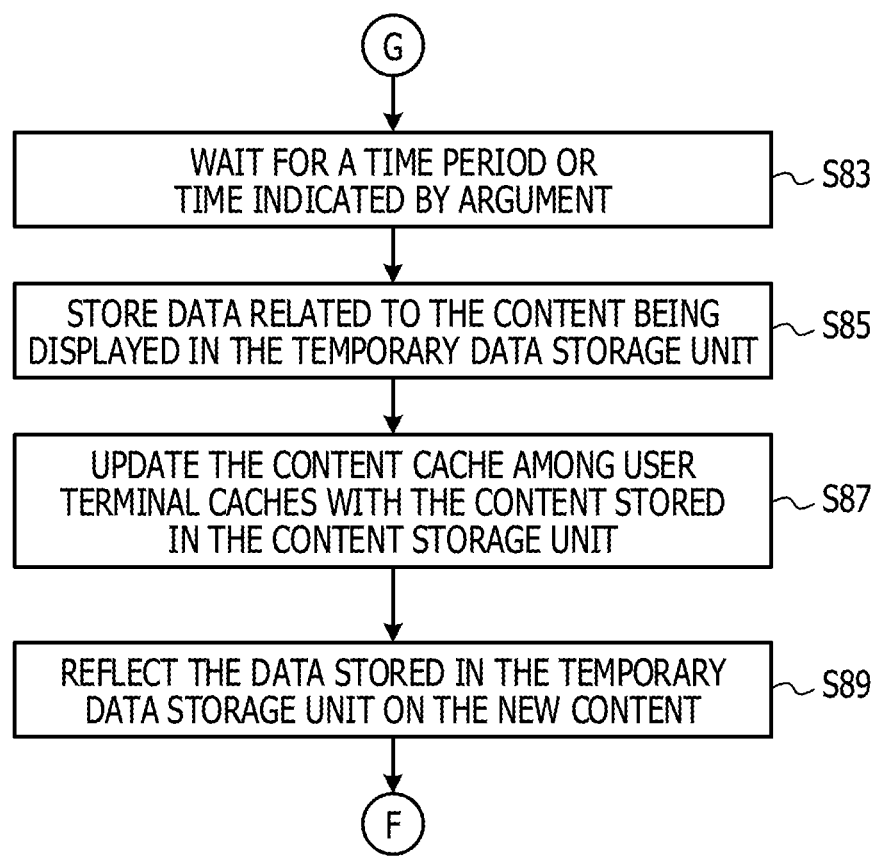
FIG. 18 is a processing flowchart of the processing performed by the user terminal.

Referring to the description in FIG. 18, the update unit 53 waits until the time period or time indicated by an argument given [do] in the push notification (FIG. 18: step S83). For example, in the case of the push notification as illustrated in FIG. 5, the update unit 53 waits for one hour. For example, in the case of the push notification as illustrated in FIG. 16, the update unit 53 waits until 13:00 on a specific date.

The update unit 53 stores data (for example, the data that was input in the form of the Web page) related to the content being displayed in the temporary data storage unit 55 (step S85).

The update unit 53 updates the cache of the content being displayed among the caches stored in the cache storage unit 57 with the content (that is to say, the content before the update) stored in the content storage unit 56 (step S87). The update unit 53 then displays the content based on the cache updated in step S87 on the screen of the user terminal 5*a*. Here, the update unit 53 may cause the process of the browser to display the content.

The update unit 53 reflects the data stored in the temporary data storage unit 55 on the content being displayed (step S89). The processing then returns to the description in FIG. 6 via connector F and terminates.

By performing the processing as described above, it becomes possible to display the updated content for a specified period of time or at a specified time, and after that, to display the original content.

Next, a description will be given of the processing subsequent to connector D with reference to FIG. 19 to FIG. 22. When "conditionsDisplay" is set as [event], if the display condition is satisfied, the content is displayed. Here, for example, it is assumed that a push notification as illustrated in FIG. 19 has been received. In FIG. 19, a content HTML that is displayed if the display condition is satisfied is described in a part of a broken-line rectangle 191.

Figure 20:
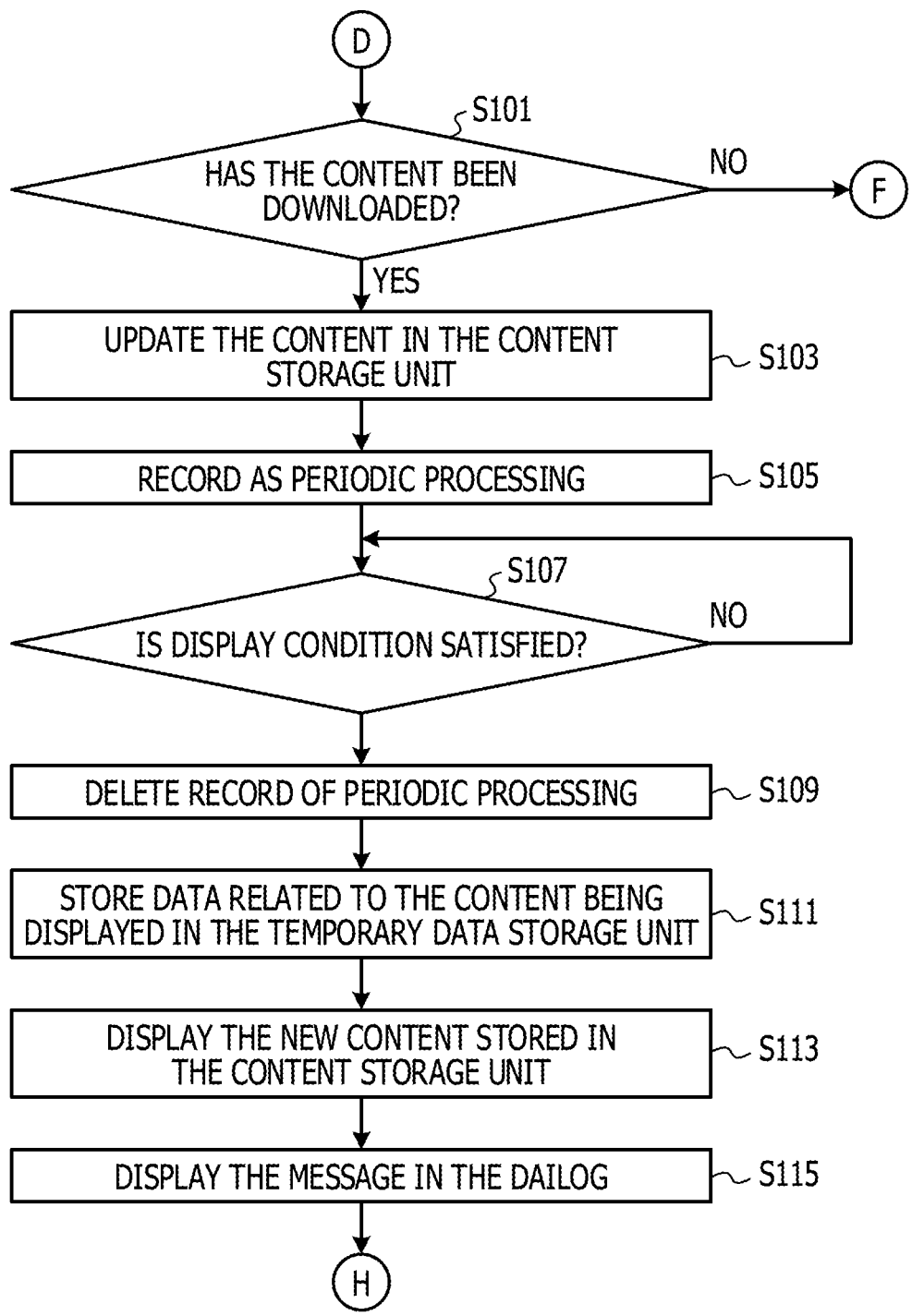
FIG. 20 is a processing flowchart of the processing performed by the user terminal.

The update unit 53 determines whether or not the target content has been downloaded to the user terminal 5*a* (FIG. 20: step S101). In this regard, in S101, a determination may be made as to whether the user is a target member based on the information stored in the user data storage unit 54 and indicating a member type.

If the target content has not been downloaded (step S101: No), the processing returns to the processing in FIG. 6 via connector F and terminates.

If the target content has been downloaded (step S101: Yes), the update unit 53 updates the target content stored in the content storage unit 56 with the data given [HTML] or [script] in the push notification (step S103). In this regard, it is assumed that the target content is content other than the content being displayed.

The update unit 53 records processing for determining whether or not the display condition indicated by the data is satisfied as periodic processing (step S105). Thereby, the processing for determining the display condition indicated by the data given [do] comes to be performed at predetermined intervals.

The update unit 53 determines whether or not the display condition is satisfied based on the data obtained by the state data acquisition unit 58 (step S107). If the display condition is not satisfied (step S107: No), the update unit 53 waits for a predetermined time period, and the processing returns to step S107.

If the display condition is satisfied (step S107: Yes), the update unit 53 deletes the periodic processing recorded in step S105 (step S109). Thereby, the processing for periodically determining whether or not the display condition indicated by the data given [do] is satisfied will not be performed.

The update unit 53 stores data (for example, the data that was input in the form of the Web page) related to the content being displayed in the temporary data storage unit 55 (step S111).

The update unit 53 displays the content updated in step S103 (step S113). Here, the content after the update may be displayed in the process of the browser.

The update unit 53 displays a message given [msg] in the push notification in the dialog (step S115). The processing then proceeds to step S117 in FIG. 21 via connector H. In step S115, the message may be displayed by the process of the browser.

Figure 21:
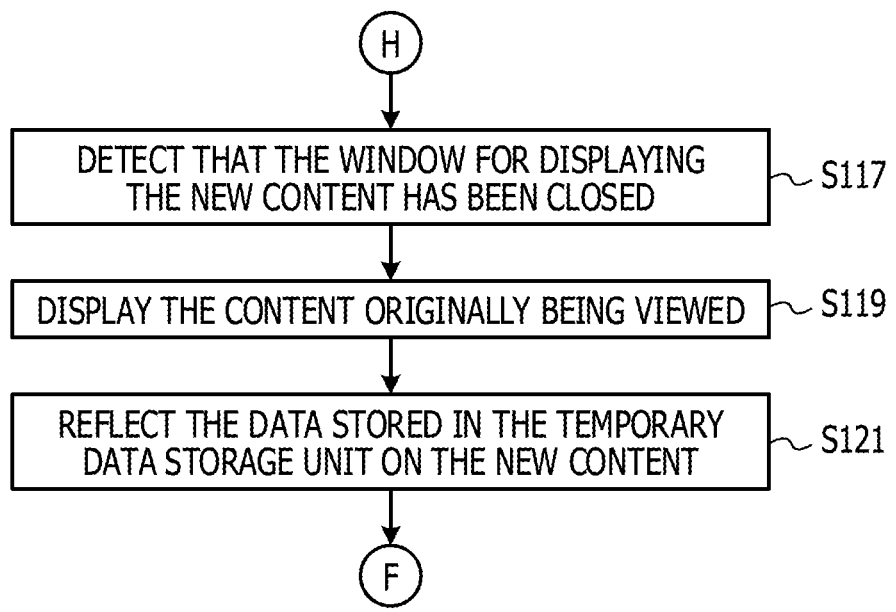
FIG. 21 is a processing flowchart of the processing performed by the user terminal.

The update unit 53 detects that the window in which the updated content is displayed has been closed (FIG. 21: step S117).

The update unit 53 reads the originally viewed content (that is to say, a content other than the target content) from the content storage unit 56 and displays it (step S119).

The update unit 53 reflects the data stored in the temporary data storage unit 55 in step S111 on the content being displayed (step S121). The processing then returns to the description in FIG. 6 via connector F and terminates.

Figure 22:
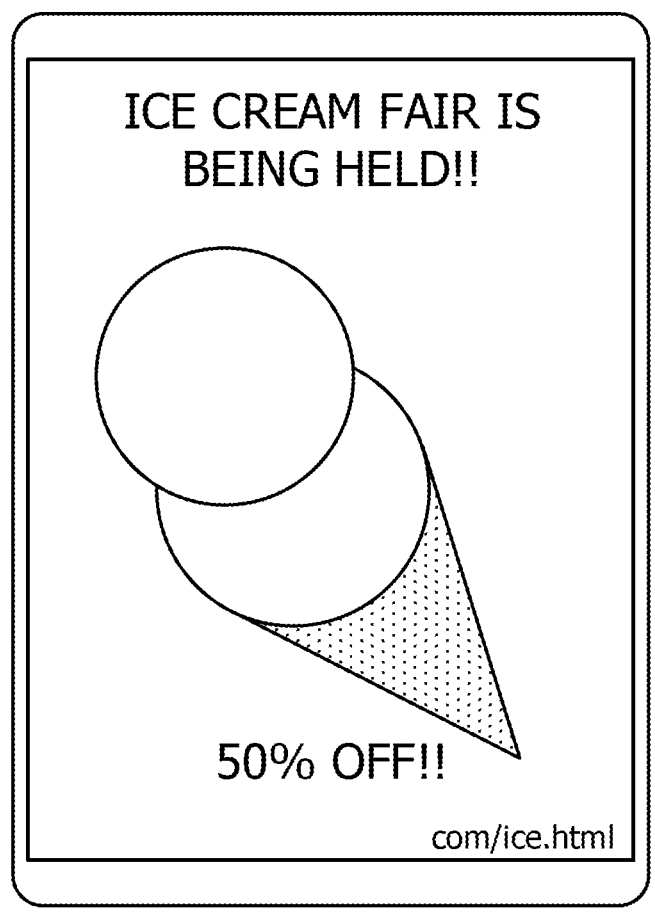
FIG. 22 is a diagram illustrating an example of a displayed content.

By performing the processing as described above, it becomes possible to display a suitable content at a suitable timing. For example, when the display condition that the temperature is equal to or higher than a predetermined temperature and the illuminance is equal to or higher than a predetermined value is satisfied, a content of ice cream is displayed as illustrated in FIG. 22.

Next, a description will be given of the processing subsequent to connector E with reference to FIG. 23. If "download" is set as [event], the content is downloaded.

Figure 23:
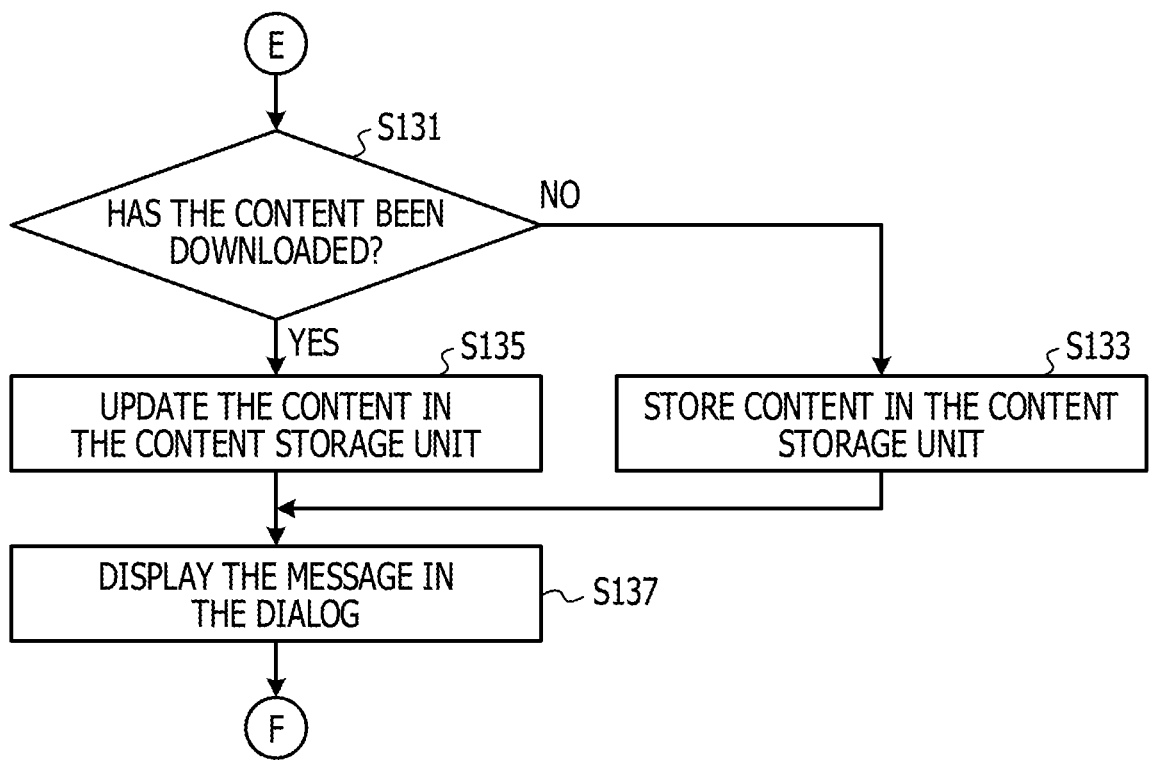
FIG. 23 is a processing flowchart of the processing performed by the user terminal.

First, the update unit 53 determines whether or not the target content has been downloaded to the user terminal 5a (FIG. 23: step S131). In this regard, in S131, a determination may be made as to whether the user is a target member based on the information stored in the user data storage unit 54 and indicating a member type.

If the target content has not been downloaded (step S131: No), the update unit 53 stores data (that is to say, a content) given [HTML] or [script] in the push notification in the content storage unit 56 (step S133). The processing then proceeds the processing in step S137.

If the target content has been downloaded (step S131: Yes), the update unit 53 updates the target content stored in the content storage unit 56 with the data given [HTML] or [script] in the push notification (step S135).

The update unit 53 displays a message given [msg] in the push notification in the dialog (step S137). The processing then returns to the description in FIG. 6 via connector F and terminates.

By performing the processing as described above, only downloading of a new content is carried out without the display being updated.

As described above, with the present embodiment, the number of communications that are performed until the update is completed becomes reduced. In this regard, if the present embodiment is not used, a push notification for notifying update is sent, a download request is made from the user terminal to the application providing server 1, and communication for downloading is performed. However, if one time of communication out of the three times of communication fails, the update will not be completed. However, with the present embodiment, it becomes possible to complete the update of the display by a push notification. Accordingly, it becomes possible to reduce the possibility of failing in the update.

Also, the user terminals 5a to 5c do not make a download request to the application providing server 1, and thus it becomes possible to reduce the processing load of the application providing server 1.

Also, content is automatically updated in response to the reception of a push notification, thereby the user does not perform the update work, and thus the operability will be improved.

Also, by using a script, it becomes possible to temporarily change the display without changing the content main body.

Also, by using [ID], it becomes possible to update a plurality of content data blocks all at once.

In the above, a description has been given of an embodiment of the present disclosure. However, the present disclosure is not limited to this. For example, the functional block configurations of the application providing server 1 and the user terminals 5a to 5c, described above sometimes do not match the real program module configuration.

Also, the data structure described above is an example, and the present disclosure does not have to have the data structure described above. Further, in the processing flows, it is possible to change the order of the processing if the processing result will not change. Further, the processing may be performed in parallel.

Figure 24:
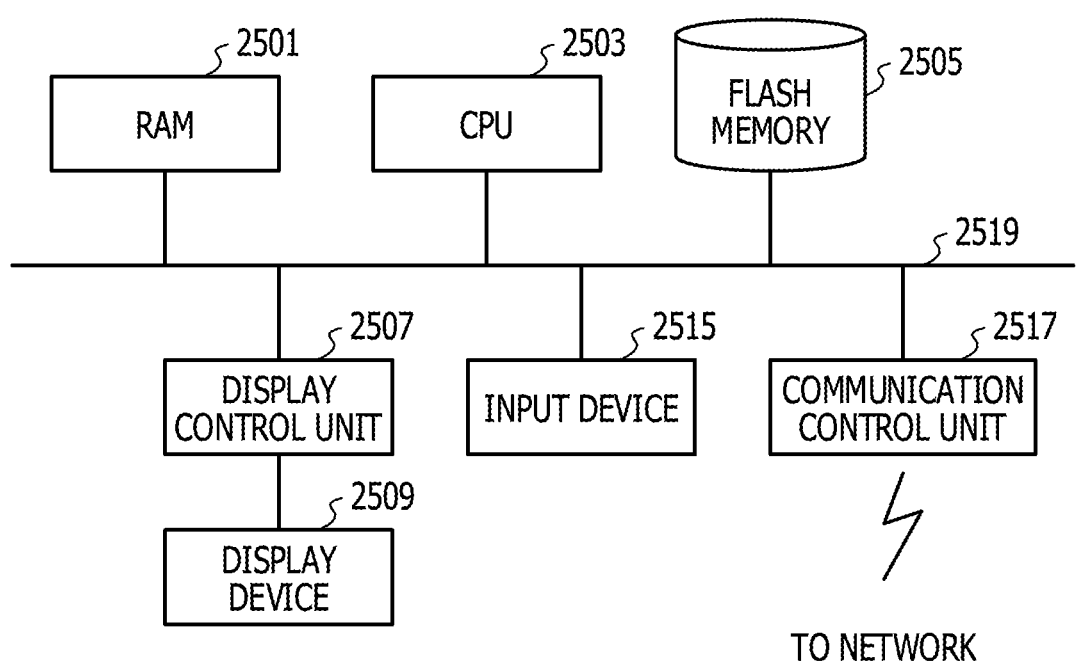
FIG. 24 is a functional block diagram of a computer.

In this regard, the above-described application providing server 1 and user terminals 5a to 5c are computer devices, and as illustrated in FIG. 24, a random access memory (RAM) 2501, a central processing unit (CPU) 2503, a flash memory 2505, a display control unit 2507 coupled to a display device 2509, an device 2515, and a communication control unit 2517 for coupling to a network are coupled via a bus 2519. An operating system (OS) and application programs for performing the processing in this embodiment are stored in the flash memory 2505, and read from the flash memory 2505 to the RAM 2501 at the time of being executed by the CPU 2503. The CPU 2503 controls the display control unit 2507 and the communication control unit 2517 in accordance with the processing contents of the application programs in order to perform a predetermined operation. Also, intermediate processing data is mainly stored in the RAM 2501, but may be stored in the flash memory 2505. In the embodiment of the present disclosure, the application program for carrying out the above-described processing is installed in the flash memory 2505 via a network, such as the Internet, or the like, and the communication control unit 2517. In such a computer device, hardware such as the above-described CPU 2503, RAM 2501, and the like, and the programs, such as an OS and application programs, and the like cooperate organically so as to realize the functions as described above.

The embodiment of the present disclosure is summarized as follows.

A display control method according to a first aspect of the present embodiment performs processing including (A) receiving a notification from the other device by one-way communication, (B) obtaining data from the notification based on the identification information included in the received notification, and (C) updating the display of a terminal device with the obtained data.

It becomes possible to reduce the number of communications performed until the display is updated. Thereby, it becomes possible to reduce a risk of update failure.

Also, this display control method may further include (D) storing input data included in the display in a storage device, and (E) updating the display with the obtained data and then reflecting the input data stored in the storage device on the display after the update. It becomes possible to avoid wasting input.

Also, this display control method may further include (E) processing for obtaining the condition for performing display after the update based on the identification information. In the processing for updating the display of the terminal device, (c1) if the condition is satisfied, the display may be updated with the obtained data. It becomes possible to update the display at a suitable timing.

Also, this display control method may further include (F) processing for obtaining information on a first time for displaying after the update from the notification based on the identification information. In the processing for updating the display of the terminal device, if (c2) the cache is updated with the obtained data, (c3) the display is updated using the cache after the update, and (c4) a first time period elapsed from the start of the display after the update, the cache after the update may be returned to the cache before the update, and (c5) the display after the update may be returned to the display before the update using the cache having been returned to the state before the update. It becomes possible to change the display only for the first time period.

Also, in the processing for obtaining data, (b1) the data may be obtained from the notification based on the identification information and the information regarding the user of the terminal device. It becomes possible to obtain data for the user of the terminal device.

Also, the obtained data may include a script of HyperText Markup Language (HTML). It becomes possible to reduce the amount of communication data by using not a HTML file itself, but a script.

Also, in the processing for updating the display of the terminal device, (c6) the display data stored in the storage device and corresponding to the display before the update may be updated with the obtained data, and (c7) the display data stored in the storage device and having been updated may be displayed.

Also, in the processing for updating the display of the terminal device, (c8) the display data stored in the storage device and corresponding to the display before the update may be updated with the obtained data, and (c9) the processing for displaying the display data stored in the storage device and updated may be executed by the process of a Web browser.

Also, in this display control method, (G) the message data to be displayed on the terminal device may be obtained based on the identification information, and (H) the obtained message data may be displayed. For example, it becomes possible to notify the user of the terminal device of the update of the display.

Also, the notification may be a push notification.

A terminal device according to a second aspect of the present embodiment performs communication with the other device. The terminal device includes (I) a reception unit (for example, the communication unit 51 in the embodiment) that receives a notification transmitted from the other device by one-way communication, (J) an acquisition unit (for example, the data processing unit 52 in the embodiment) that obtains data from the notification based on the identification information included in the received notification, and an update unit (for example, the update unit 53 in the embodiment) that updates the display of the terminal device with the obtained data.

In this regard, it is possible to create a program for causing a processor to perform the processing by the above-described method. The program is stored in a computer readable storage medium or a storage device, for example, a flexible disk, a CD-ROM, a magneto-optical disk, a semiconductor memory, a hard disk, or the like. In this regard, intermediate processing result is temporarily stored in a storage device, such as a main memory, or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing a display control program that causes a computer to execute a process comprising:

receiving a push notification from a server in one-way communication via a network;

determining whether specific information is included in the push notification;

when it is determined that the specific information is not included in the push notification, downloading server data from the server by transmitting a request to the server, and updating, in accordance with the server data, display contents of a display device of the computer; and when it is determined that specific information is included in the push notification, extracting push data included in the push notification, and updating the display contents of the display device of the computer from first display contents to second display contents based on the push data.

2. The recording medium according to claim 1, wherein the updating based on the push data includes, obtaining input data inputted by a user when the first display contents are displayed on the display device, and generating the second display contents on which the input data has been reflected.

3. The recording medium according to claim 1, the process further comprising: determining a condition for executing the updating based on the push data from the push notification including the specific information, wherein the updating based on the push data is executed when the condition is satisfied.

4. The recording medium according to claim 1, the process further comprising:

specifying time information indicating a first time period included in the push notification; and when the first time period has elapsed since a start of displaying the second display contents, updating the display contents of the display device from the second display contents to the first display contents.

5. The recording medium according to claim 1, wherein the extracting includes, specifying user information regarding a user of the computer from a memory included in the computer, and extracting a user type from the push notification, and wherein the updating based on the push data is executed when the user information satisfies the extracted user type.

6. The recording medium according to claim 1, wherein the push data includes a HyperText Markup Language script.

7. The recording medium according to claim 1, wherein the updating based on the push data includes, changing first display data corresponding to the first display contents stored in a storage device to second display data based on the push data, and updating the display contents of the display device from the first display contents to the second display contents based on the second display data stored in the storage device.

8. The recording medium according to claim 7, wherein the updating based on the second display data is carried out by causing a Web browser to perform displaying the second display data stored in the storage device.

9. The recording medium according to claim 1, the process further comprising:

obtaining message data included in the push notification including the specific information; and displaying a text corresponding to the obtained message data on the display device.

10. The recording medium according to claim 1, wherein the push notification is transmitted from the server to the computer by designating a device token of the computer.

11. A display control method executed by a computer, the method comprising:
receiving a push notification from a server in one-way communication via a network;
determining whether specific information is included in the push notification;
when it is determined that the specific information is not included in the push notification,
downloading server data from the server by transmitting a request to the server, and
updating, in accordance with the server data, display contents of a display device of the computer; and
when it is determined that specific information is included in the push notification,
extracting push data included in the push notification, and
updating the display contents of the display device of the computer from first display contents to second display contents based on the push data.

12. A display control device comprising:
a display; and
a processor coupled to the display and the processor configured to,
receive a push notification from a server in one-way communication via a network;
determine whether specific information is included in the push notification;
when it is determined that the specific information is not included in the push notification,
download server data from the server by transmitting a request to the server, and
update, in accordance with the server data, display contents of a display device of the computer; and
when it is determined that specific information is included in the push notification,
extract push data included in the push notification, and
update the display contents of the display device of the computer from first display contents to second display contents based on the push data.

13. The display control method according to claim 11, wherein the push data includes a HyperText Markup Language script.

14. The display control method according to claim 11, wherein the updating based on the push data includes,
changing first display data corresponding to the first display contents stored in a storage device to second display data based on the push data, and
updating the display contents of the display device from the first display contents to the second display contents based on the second display data stored in the storage device.

15. The display control method according to claim 14, wherein the updating based on the second display data is carried out by causing a Web browser to perform displaying the second display data stored in the storage device.

16. The display control method according to claim 11, further comprising:
obtaining message data included in the push notification including the specific information; and
displaying a text corresponding to the obtained message data on the display device.

17. The display control method according to claim 11, wherein the push notification is transmitted from the server to the computer by designating a device token of the computer.

* * * * *